(12) United States Patent
Becker et al.

(10) Patent No.: US 8,372,909 B2
(45) Date of Patent: Feb. 12, 2013

(54) COMPOSITE EDGE FOR PRODUCING DOUBLE OR MULTIPLE PANE INSULATION GLASS OR SOLAR MODULES

(75) Inventors: Harald Becker, Stelzenberg (DE); Heike Brücher, Rathsweiler (DE); Norbert Schott, Zweibrücken (DE)

(73) Assignee: ADCO Products, Inc., Michigan Center, MI (US)

( * ) Notice: Subject to any disclaimer, the term of this patent is extended or adjusted under 35 U.S.C. 154(b) by 0 days.

(21) Appl. No.: 12/679,250

(22) PCT Filed: Sep. 22, 2008

(86) PCT No.: PCT/DE2008/001564
§ 371 (c)(1),
(2), (4) Date: Oct. 18, 2010

(87) PCT Pub. No.: WO2009/036752
PCT Pub. Date: Mar. 26, 2009

(65) Prior Publication Data
US 2011/0048509 A1   Mar. 3, 2011

(51) Int. Cl.
C08K 3/04   (2006.01)

(52) U.S. Cl. ......... 524/495; 524/502; 524/506; 524/579

(58) Field of Classification Search .................. 524/495, 524/502, 506, 579
See application file for complete search history.

(56) References Cited

U.S. PATENT DOCUMENTS

| | | | |
|---|---|---|---|
| 5,430,087 A * | 7/1995 | Carlson et al. ................ | 524/496 |
| 6,384,315 B1 | 5/2002 | Yamagishi et al. | |
| 6,673,997 B2 | 1/2004 | Blieske et al. | |
| 7,033,655 B2 | 4/2006 | Beteille et al. | |
| 7,449,629 B2 | 11/2008 | Ferri et al. | |
| 2003/0162882 A1 * | 8/2003 | Grimm et al. ................. | 524/493 |
| 2004/0216778 A1 | 11/2004 | Ferri et al. | |
| 2006/0205887 A1 | 9/2006 | Nakagawa et al. | |
| 2007/0203297 A1 | 8/2007 | Wakabayashi et al. | |
| 2008/0121267 A1 | 5/2008 | Stevenson et al. | |
| 2008/0155908 A1 | 7/2008 | Nomura et al. | |
| 2010/0012166 A1 | 1/2010 | Yamanaka et al. | |

FOREIGN PATENT DOCUMENTS

| | | |
|---|---|---|
| DE | 19624236 | 1/1998 |
| DE | 19821355 | 11/1999 |
| DE | 10204174 | 7/2002 |
| DE | 102004032604 | 2/2006 |
| EP | 517067 | 12/1992 |
| EP | 714964 | 6/1996 |
| EP | 823531 | 2/1998 |
| EP | 0916801 | 5/1999 |
| EP | 1615272 | 1/2006 |
| WO | WO0116046 | 3/2001 |
| WO | WO2007137719 | 12/2007 |

* cited by examiner

Primary Examiner — Ling Choi
Assistant Examiner — Wenwen Cai
(74) Attorney, Agent, or Firm — Vivacqua Law, PLLC; Raymond J. Vivacqua

(57) ABSTRACT

A sealing compound includes a polymer modified with special, reactive groups and has the following overall composition:

a) 30-60 wt. %, preferably 40-50 wt. %, olefinic polymers, Mn 400-600,000 D, preferably 5,000-300,000 D
b) 2-35 wt. %, preferably 5-25 wt. %, modified polymer
c) 5-40 wt. %, preferably 10-30 wt. %, fine-particle, inert fillers
d) 5-25 wt. %, preferably 10-15 wt. %, desiccants and water scavengers 0-3 wt. % aging resistors, in particular anti-oxidants or UV stabilizers.

12 Claims, No Drawings

COMPOSITE EDGE FOR PRODUCING DOUBLE OR MULTIPLE PANE INSULATION GLASS OR SOLAR MODULES

CROSS-REFERENCE TO RELATED APPLICATIONS

This application claims priority to International Application No. PCT/DE/2008/001564, filed on Sep. 22, 2008, which claims priority to German priority document DE/10 2007 045 104.2, filed on Sep. 20, 2007.

This invention relates to an edge seal for manufacturing two-pane or multi-pane insulating glass or solar modules, there being provided a primary sealant and a secondary sealant.

The construction of insulating glass units comprising two-pane or multi-pane glass is known. In addition to the glass panes, it is standard practice to use sealants and/or adhesives, spacers and desiccants for this purpose. Solar-module glazing (both photovoltaic solar modules and solar modules for heating water) is assembled in the same way, except that the two glass panes can be replaced partially or completely by sheet metal and/or plastic film.

The spacer consists primarily of metal (usually aluminum), is located in the edge area of the glass panes and has the function of maintaining the two glass panes at the desired distance apart. A desiccant (e.g. a molecular sieve) is contained additionally within the hollow spacer in order to keep the air or gas trapped between the panes dry. To enable the desiccant to absorb moisture at all, the spacer is provided with small apertures (longitudinal perforation) on the side facing the interpane space. This arrangement prevents moisture from condensing on the inside of the glass panes at low ambient temperatures and impairing the transparency of the insulating glass unit.

Between the sides of the spacer that face the glass panes and the inner surfaces of the glass panes, a seal based on polyisobutylene and/or butyl rubber is provided. This seal is generally known as the primary seal. The function of the primary seal is a) during production of the insulating glass panes, to be a kind of "assembly aid" while the glass panes are being joined to the spacer, which has been pre-coated with primary sealant, in order to hold the assembly together during the next production stages, and b) later, during the service life of the insulating glass unit, to form a water-vapor barrier that prevents moisture from penetrating from the exterior inwards into the interpane space, and, if the insulating glass unit is filled with gas, to prevent loss of this gas outwards from the interpane space.

As the outward-facing edge of the spacer is a few millimeters inside of the outside edges of the glass panes, a "channel" is formed into which the secondary sealant, as it is generally known, is injected. The main purpose of the secondary seal is to elastically bond the edge of the insulating glass unit (glass panes and spacer) and also to form a seal—which is to some extent an additional seal—against water and water vapor from the outside and gas from the inside (interpane space). As a rule, the secondary seal consists of room-temperature-curing, two-part sealants and/or adhesives based on polysulfide, polyurethane or silicone. One-part systems, for example based on silicone, or a hot-melt butyl adhesive applied while hot, are also possible.

The systems described above, however, also have certain disadvantages. During production of the insulating glass units, a large number of materials have to be processed in a series of complicated and cost-intensive stages, some of which take place simultaneously.

As far as the thermal insulation properties of the edge seal are concerned, metal spacers used there have the disadvantage of being good heat conductors and thus having a negative influence on an insulating glass pane's desirable low K-value, which, in the case of double- or multi-pane insulating glass, has been improved substantially in recent years by filling the interpane space with inert gas and using glass panes coated with low-emission (low-E) layers.

Particularly as a consequence of the second disadvantage, increasing numbers of insulating glass systems have become available recently which, in place of aluminum as spacer, use a) prefabricated stainless steel profiles (lower wall thickness possible and hence reduced heat flow) or b) prefabricated plastic profiles or c) prefabricated thermoplastic profiles or d) extrusion compound comprising thermoplastic materials extruded directly onto one of the glass panes.

On account of the improved thermal insulation properties in the edge seal, these systems are also known as "warm-edge systems".

Examples of c) may be found in EP 517 067 A2, examples and application machinery for d) in EP 714 964 A1, EP 176 388 A1 and EP 823 531 A2.

The DE 196 24 236 A1 describes a hot-melt adhesive composition for insulating glass, containing a mixture of at least one reactive binder based on silane-functional polyisobutylene, hydrogenated polybutadiene and/or poly-α-olefins, and a non-reactive binder from the group comprising the butyl rubbers, poly-α-olefins, diene polymers, polybutene or styrene block copolymers, which composition may be used as 1- or 2-part adhesive/sealant in the production of insulating glasses. No separate spacers comprising metal or plastic profiles are needed here, and no additional, secondary sealants.

The DE 198 21 355 A1 describes a sealing compound for use in the production of multi-pane insulating glass; the compound contains silane-modified butyl rubber and serves as spacer between the individual panes of the multi-pane insulating glass. Here too, no secondary sealant is needed.

Particularly those spacers extruded directly onto one of the glass panes also overcome the problems relating to the manufacturing process. As a result, insulating glass panes can be made using an automated process which is much more flexible and more productive.

In the field of solar module manufacture, too, applying the spacer directly onto the module edges in this manner has proved to offer many advantages. Compared, for example, with the manual or semi-automatic fitting of pre-extruded butyl tapes, this solution brings not only optical advantages but also productivity advantages; in addition, it makes for a more reliable long-term barrier against water-vapor penetration and gas leakage. The EP 1 615 272 A1 (or DE 10 2004 032 604 A1) contains a description of an exemplary method and device for assembling solar modules.

The thermoplastic material used combines the function of the spacer with that of the primary seal, as it is called. It also contains the desiccant. The TPS system (TPS=thermoplastic spacer) is an example of such a system.

With these systems, too, the outward-facing edge of the spacer is a few millimeters inside of the outer edges of the glass panes, and the remaining space is filled by the secondary seal, as it is called, which bonds the units elastically.

Where silicone is used as the secondary sealant in combination with a thermoplastic spacer such as the TPS system, it has been found that insulating glass units, including those filled with inert gas, can be manufactured substantially more reliably and retain their gastightness in the edge seal even after a large number of weathering cycles (EP 916 801 A2). It is very difficult to obtain equally low gas-leakage rates when using metallic spacers combined with a standard primary seal and a silicone-based secondary seal.

Combined with polysulfide as secondary sealant, the TPS system has, over the past ten years, proved to be completely unproblematic in insulating-glass fenestration applications.

However, particularly in cases where silicone is used as secondary sealant, there is a disadvantage that can, in certain cases, manifest itself as an optical defect within the insulating glass units. A combination of:

a) materials (e.g. weather seal, EPDM glazing profiles, etc.) which, due to external influences, are not compatible with the insulating-glass edge seal, and b) construction errors in the glazing area of the insulating glass units, caused by inadequate planning (poor ventilation/drainage of the glass grooves), and c) extreme exposure (particularly high temperatures at the insulating glass pane and in the edge seal) due to the situation of the installation can cause deformation or movement of the thermoplastic spacer profile into the interpane space. This phenomenon is also known in German as the "Girlanden" Effect. Depending on the quality of the TPS sealant used (formulation/production process), there are marked differences in susceptibility to the external influences described under points a) to c). Where silicone is used as secondary sealant, the main reason may be assumed to be the lack of adhesion between the TPS sealant and the secondary seal, and the inadequate adhesion—based only on predominantly physical interactions—of the TPS sealant to the glass. This bond may be easily weakened to a greater or lesser extent by substances migrating into the glass/TPS sealant interface.

Proposals for creating a connection of such kind between the TPS and the silicone secondary seal as to achieve mechanical anchorage or a frictional connection by way of a specially shaped cross-section for the extruded TPS profile (DE 102 04 174 A1) unfortunately cannot be implemented due to the impossibility of obtaining a suitably shaped die for extruding such a profile cross-section. Another problem with this proposal that has not been solved is exactly how to join up the beginning and the end of the spacer profile extruded onto the glass pane. For a normal rectangular cross-section, this has been described and solved in the EP 823 531 A2. A further difficulty with this proposal is encountered while applying the secondary sealant and consists in how to completely fill the partially convex voids within the TPS strand without incorporating any air bubbles. All in all, therefore, this proposal is one that cannot be implemented as such in an everyday production process, and accordingly does not establish the desired objective.

Attempts to achieve chemical adhesion between the TPS sealant and the silicone sealant by selective addition of traditional, silane-based adhesion promoters to one and/or both sealants also fail. To this end, it is necessary to use grades and quantities which unfortunately have a negative influence on other desired properties, for example the working consistency of the TPS sealant, or which later on cause fogging in the insulating glass when the unit has been installed.

The object of the invention is thus to provide an edge seal which is free of the disadvantages described and which, especially also under high stresses (external influences due to incompatible materials, extremely high temperatures and UV radiation), ensures permanent stability of the TPS edge seal and thereby reliably prevents any deformation of movement of the thermoplastic spacer profile into the interpane space.

This object is established by means of an edge seal characterized in that the primary sealant contains a polymer modified with special groups and has the following overall composition:

a) 30-60 wt. %, preferably 40 to 50 wt. %, olefinic polymers, Mn 400-600,000 D, preferably from 5,000 to 300,000 D b) 2-35 wt. %, preferably 5-25 wt. %, modified polymer c) 5-40 wt. %, preferably 10-30 wt. %, fine-particle, inert fillers d) 5-25 wt. %, preferably 10-15 wt. %, desiccants and water scavengers e) 0-3 wt. % aging resistors, in particular anti-oxidants or UV stabilizers, and that the secondary sealant is a silicone-based sealant.

Thanks to the share of reactive groups bound to part of the primary sealant's polymer composition, the sealing compound according to the invention adheres markedly better to other materials, in particular glass, metals and plastic, than is the case with prior-art sealing compounds. In the invention, aside from the purely physical interactions which form the basis for glass adhesion in the prior art, chemical bonds are formed by hydrolysis-condensation reactions between the modified polymer constituents and the chemically active groups (—Z—OH) of the substrate surface.

Where silicone is used as secondary sealant, the two sealants also bond additionally by way of cross-linking across the interface between the sealing compound and the silicone sealant during its curing. The TPS sealant and silicone secondary sealant thereby produce a seal which is substantially more stable toward external influences (e.g. plasticizer migration from incompatible materials), even at high temperatures and under exposure to alternating temperatures, so that any formation of "Girlande" is completely ruled out.

One embodiment of the invention consists in that the olefinic polymers are selected from the group comprising polyisobutylene, polybutene, butyl rubber (polyisobutylene-isoprene), styrene block copolymers, especially SBS, SIS, SEBS, SEPS, SIBS, SPIBS, also in modified form, and amorphous copolymers and/or terpolymers of α-olefins (APAO).

The scope of the invention provides for the modified polymer to be selected from the group comprising polyisobutylene, polybutene, butyl rubber (polyisobutylene-isoprene), styrene block copolymers, especially SBS, SIS, SEBS, SEPS, SIBS, SPIBS, also in modified form, and amorphous copolymers and/or terpolymers of α-olefins (APAO), the polymer being modified with at least one group of formula (1) which is a terminal group or is distributed statistically within the chain

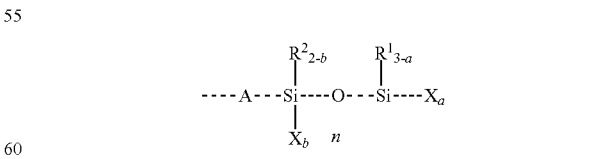

where -A- is $$—(CH_2)_m— \quad (2),$$

$$—S—(CH_2)_m— \quad (3) \text{ or}$$

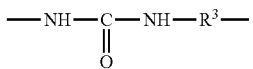

and $R^1$ and $R^2$ are the same or different and are an alkyl group having 1 to 20 carbon atoms, an aryl group having 6 to 20 carbon atoms or an aralkyl group having 7 to 20 carbon atoms, X is a hydroxyl group or a hydrolyzable group, a is 0, 1, 2 or 3 and b is 0, 1 or 2, the sum of a and b being greater than or equal to 1, and where n is a whole number between 0 and 18, m is a whole number between 0 and 4 and $R^3$ is

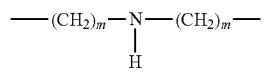

It is also within the scope of the invention for the fillers to be selected from the group comprising ground and precipitated chalks, silicates, silicon oxides and carbon blacks.

In this connection, the invention also provides for the chalks to be surface-treated.

However, it is also possible to use non-surface-treated chalks.

The invention furthermore provides for the silicates to be selected from the group comprising talc, kaolin, mica, silicon oxides, silicas and calcium or magnesium silicates.

It is also with the scope of the invention for the desiccants or water scavengers to be selected from molecular sieves (zeolites) of types 3A to 10A.

Of course, other substances that bond water chemically or physically may also be used.

It is possible to formulate the sealing compound either as a one-part sealing compound or as a two-part sealing compound. In the case of a one-part sealing compound, all the components are mixed together during the production process. In the case of a two-part sealing compound, the olefinic polymers (a) are mixed together with some of the fine-particle inert fillers (c) and the water-binding fillers (d) in one part, e.g. part A; a second part, part B, is manufactured from some of the fine-particle inert fillers together with some of the olefinic polymers (a) and/or the entire quantity of modified polymers (b) and the aging resistors (e). The two parts of the compound are then mixed together immediately prior to application.

The invention also provides for the aging resistors to be selected from the group comprising sterically hindered phenols, thioethers, mercapto compounds, phosphorus esters, benzotriazoles, benzophenones, HALS and antiozonants.

Last but not least, it is also within the scope of the invention to use the inventive sealing compound for fabricating insulating glass for windows, conservatories, structural and roof glazing, for glazing in land-bound vehicles, watercraft and aircraft, and for manufacturing solar modules.

The invention is explained in detail below by reference to an embodiment and a comparative example.

COMPARATIVE EXAMPLE 1

Prior Art

Composition a) 50 wt. % PIB of MW 60,000
b) 20 wt. % Carbon black
c) 14 wt. % $CaCO_3$
d) 15 wt. % A3-type molecular sieve
e) 1 wt. % phenolic antioxidant

EMBODIMENT 2 ACCORDING TO THE INVENTION

Composition a) 42 wt. % PIB
b) 12 wt. % silane-modified APAO or PIB
c) 10 wt. % $CaCO_3$
d) 20 wt. % Carbon black
e) 15 wt. % A3-type molecular sieve
f) 1 wt. % phenolic antioxidant The effect of the sealing compound of this invention compared to the prior art becomes evident from the following comparative test:

To one long edge in each case of test insulating-glass panes measuring 500×350 mm and constructed as 4 mm float glass/16 mm interpane space/4 mm float glass plus the edge seal consisting in the one instance of 1) the sealing compound of the comparative example 1 as thermoplastic spacer and a conventional 2-part silicone as secondary sealant, and in the other instance of
2) the sealing compound according to embodiment 2 of the invention as thermoplastic spacer and the same conventional 2-part silicone as in 1) as secondary sealant, an EPDM profile of the kind typically employed for glazing applications and having a plasticizer content of about 20% mineral oil is bonded using a one-part silicone sealant with a high silicone-plasticizer content, said profile thus being brought into direct contact with the edge-seal sealants. The test panes prepared in this way were then exposed to a weathering-cycle test (−20° C./+80° C. at 95-100% rel. humidity, 8 hours per cycle, 3 cycles per day).

After only about 4-5 weeks of the weathering-cycle test, test pane 1) showed deformation, i.e. movement, of the thermoplastic spacer profile into the interpane space. This was caused by the incompatibility reactions (plasticizer migration from the EPDM profile and the one-part silicone sealant).

Test pane 2), by contrast, showed no impairment of the edge seal whatsoever even after more than 50 weeks of the weathering-cycle test.

Similarly, the glass adhesion and the edge seal showed no recognizable impairment whatsoever after more than 4,000 hours of irradiation with UV lamps (Osram Ultravitalux) and temperatures at the pane surfaces of up to 110° C.

An edge seal that can withstand stresses of this kind is thus suitable not only for insulating-glass applications in particularly demanding situations, e.g. frameless glazing in facades or roofs (known as structural glazing), but also, for example, for the edge seal in solar modules.

In addition to the first application of a strand of reactive butyl compound, it is also possible to apply a second strand of butyl before the solar module is pressed. This is a particularly useful solution in cases where the electrical contacts of the photovoltaic cells contained in the module are made to pass through the edge seal to the outside. After the first strand has been applied, the contacts—usually in the form of thin tape—are channeled to the exterior and the second butyl strand is then extruded directly on top of the first one. The contacts are thereby embedded in the butyl compound, thus ensuring that in the finished solar module, the contact lead-throughs across the edge seal to the outside are gastight and impermeable to water vapor. Since the contacts are usually in the form of non-insulated metal tapes, the edge seal must not show any electrical conductivity, as this can cause fault current or short circuits between the contacts. In the case of a silicone-based secondary seal, this is no problem, since silicones typically show very high volume resistivities, mostly >10$^{14}$ Ohm·cm, and thus fall within the category of electrical insulators. However, butyl sealants with a high filler content of Carbon black—as in the case of the reactive butyl compound described here—have volume resistivities of <10$^6$ Ohm·cm, meaning that the compound would be electrically conductive. Reducing the Carbon black content admittedly increases the volume resistivity, but also brings many disadvantages. Aside from mechanical reinforcement and viscosity regulation, the purpose of a high Carbon black content in a butyl sealant is to make the mixture particularly stable toward high temperatures and UV irradiation. If the Carbon black content were to be substantially reduced because of the volume resistivity, this would no longer be the case and the butyl sealing compound would no longer show the required long-term stability for applications in the field of solar modules, i.e. for applications involving high temperatures and solar radiation. By using a special Carbon black in place of the Carbon blacks generally used in butyl sealants, however, it is possible to obtain a reactive butyl compound that has all the required properties. It transpired that by selecting an oxidatively post-treated Carbon black made by the furnace process and having a primary-particle size in the 50-60 nm range, a Carbon black had been found which not only permitted filler contents of up to 20 wt. % for the reactive butyl compound, which are necessary for stabilization, mechanical reinforcement and viscosity regulation, but simultaneously result in a volume resistivity of >10$^{10}$ Ohm·cm, which is fully adequate for the electrical insulating effect required of the reactive butyl sealing compound.

A special Carbon black of this kind is used in the following embodiment.

EMBODIMENT 3 ACCORDING TO THE INVENTION

Composition a) 40 wt. % PIB
b) 10 wt. % silane-modified APAO or PIB
c) 20 wt. % CaCO$_3$
d) 17 wt. % special Carbon black
e) 12 wt. % A3-type molecular sieve
f) 1 wt. % phenolic antioxidant

The invention claimed is:

1. A pumpable sealant for forming a moisture vapor barrier between a first substrate and a second substrate, the sealant comprising:
an olefinic polymer;
at least one of a silane modified APAO and a silane modified polyisobutylene;
at least one filler;
a carbon black wherein the carbon black is included in an amount from about 5% to about 20% by weight of the total composition;
at least one of a water scavenger and a desiccant; and
at least one aging resistor, and
wherein the carbon black is oxidatively post treated by a furnace process and has a primary particle size of about 50 nm to about 60 nm,
wherein the pumpable sealant is configured to be pumped directly onto at least one of the first and second substrates to form the moisture vapor barrier and the pumpable sealant has a volume resistivity of greater than 1×10$^{10}$ ohms·cm.

2. The pumpable sealant of claim 1 wherein the olefinic polymer includes a polyisobutylene in an amount from about 32% to about 60% by weight of the total composition, the at least one of the silane modified APAO and the silane modified polyisobutylene is included in an amount from about 2% to about 35% by weight of the total composition, the filler is included in an amount from about 5% to about 47% by weight of the total composition, the at least one of the water scavenger and the desiccant is included in an amount from about 5% to about 25% by weight of the total composition, and the aging resistor is included in an amount from 0.1% to about 3% by weight of the total composition.

3. The pumpable sealant of claim 1 wherein the olefinic polymer includes a polyisobutylene in an amount of about 42% by weight of the total composition, the at least one of the silane modified APAO and the silane modified polyisobutylene is included in an amount of about 12% by weight of the total composition, the filler is included in an amount of about 10% by weight of the total composition, the carbon black is included in an amount of about 20% by weight of the total composition, the at least one of the water scavenger and the desiccant is included in an amount of about 15% by weight of the total composition, and the aging resistor is included in an amount of about 1% by weight of the total composition.

4. The pumpable sealant of claim 1 wherein the olefinic polymer includes a polyisobutylene in an amount of about 40% by weight of the total composition, the at least one of the silane modified APAO and the silane modified polyisobutylene is included in an amount of about 10% by weight of the total composition, the filler is included in an amount of about 20% by weight of the total composition, the carbon black is included in an amount of about 17% by weight of the total composition, the at least one of the water scavenger and the desiccant is included in an amount of about 12% by weight of the total composition, and the aging resistor is included in an amount of about 1% by weight of the total composition.

5. The pumpable sealant of claim 1 wherein the olefinic polymer includes a polyisobutylene in an amount from about 30% to about 50% of the total composition.

6. The pumpable sealant of claim 1 wherein the at least one of the silane modified APAO and the silane modified polyisobutylene is included in an amount from about 5% to about 25% of the total composition.

7. The pumpable sealant of claim 1 wherein the filler is present in the sealant composition relative to the olefinic polymers in a ratio of approximately 1:1.35 to approximately 1:1.8.

8. The pumpable sealant of claim 1 wherein the at least one of the water scavenger and the desiccant is a molecular sieve included in an amount from about 5% to about 15% of the total composition.

9. The pumpable sealant of claim 1 wherein the pumpable sealant is oxidatively stable after 4000 hrs of exposure to temperatures greater than 110° C.

10. A sealant disposed between a first substrate having a hydroxyl group and a second substrate having a hydroxyl group, the sealant configured to inhibit the transmission of moisture to a moisture sensitive material disposed between the first and second substrates, the sealant comprising:
an olefinic polymers or combinations thereof;
at least one of a silane modified APAO and a silane modified polyisobutylene;
a carbon black present in an amount from about 5% to about 20% by weight;

a filler;
at least one of a water scavenger and a desiccant; and
an aging resistor, and
wherein the carbon black is oxidatively post treated by a furnace process and has a primary particle size of about 50 nm to about 60 nm,
wherein the at least one of a silane modified APAO and a silane modified polyisobutylene includes reactive group that chemically bonds with the reactive group of the first and second substrates to form a bond that is greater than the cohesive strength of the sealant and wherein the sealant has a volume resistivity of greater than $1\times10^{10}$ ohms·cm.

11. The sealant of claim 10 wherein the sealant is oxidatively stable after 4000 hrs of exposure to temperatures greater than 110° C.

12. The sealant of claim 10 wherein the sealant is configured to be pumped directly onto at least one of the first and second substrates to form a moisture vapor barrier between the first and second substrates, and wherein the bond and the sealant produce a seal that is substantially stable to external influences of high temperature and thermal cycling.

* * * * *